United States Patent
Hyung et al.

(10) Patent No.: US 11,038,227 B2
(45) Date of Patent: Jun. 15, 2021

(54) BATTERY POUCH INCLUDING NANOCERAMIC COATING

(71) Applicant: Apple Inc., Cupertino, CA (US)

(72) Inventors: YooEup Hyung, San Jose, CA (US);
Sang Young Yoon, San Jose, CA (US);
Dennis M. Foley, San Jose, CA (US);
Richard M. Mank, Los Alto, CA (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 15/476,713

(22) Filed: Mar. 31, 2017

(65) Prior Publication Data

US 2018/0083232 A1    Mar. 22, 2018

Related U.S. Application Data

(60) Provisional application No. 62/397,314, filed on Sep. 20, 2016.

(51) Int. Cl.
| | |
|---|---|
| *H01M 50/116* | (2021.01) |
| *H01M 50/124* | (2021.01) |
| *H01M 50/183* | (2021.01) |
| *H01M 10/052* | (2010.01) |

(52) U.S. Cl.
CPC ....... *H01M 50/116* (2021.01); *H01M 50/124* (2021.01); *H01M 50/183* (2021.01); *H01M 10/052* (2013.01); *H01M 2220/30* (2013.01)

(58) Field of Classification Search
CPC .. H01M 2/026; H01M 2/0275; H01M 2/0277; H01M 2/0285; H01M 2/08; H01M 10/052; H01M 10/647; H01M 2220/30; H01M 50/116; H01M 50/124; H01M 50/183; Y02E 60/10
See application file for complete search history.

(56) References Cited

U.S. PATENT DOCUMENTS

| | | | | |
|---|---|---|---|---|
| 2,774,737 | A * | 12/1956 | Mager | H05B 33/20 252/301.36 |
| 7,285,334 | B1 * | 10/2007 | Yamashita | H01M 2/0267 428/458 |
| 8,748,022 | B2 | 6/2014 | Song et al. | |
| 9,190,633 | B2 | 11/2015 | Lee et al. | |
| 10,299,374 | B2 | 5/2019 | Shashkov et al. | |
| 2003/0077484 | A1 * | 4/2003 | Cho | H01M 2/0426 429/7 |
| 2005/0014036 | A1 * | 1/2005 | Kim | H01M 2/021 429/7 |
| 2006/0083984 | A1 * | 4/2006 | Oh | B32B 3/26 429/176 |
| 2006/0093908 | A1 * | 5/2006 | Hwang | H01M 2/0285 429/185 |
| 2009/0202905 | A1 * | 8/2009 | Morita | H01M 4/131 429/212 |
| 2013/0029140 | A1 * | 1/2013 | Takao | H01G 9/08 428/336 |
| 2014/0255765 | A1 * | 9/2014 | Akita | B32B 7/12 429/176 |
| 2014/0273890 | A1 * | 9/2014 | Huang | H01M 10/0436 455/90.2 |
| 2014/0335403 | A1 * | 11/2014 | Akita | H01M 2/0287 429/176 |
| 2016/0093837 | A1 | 3/2016 | Bushnell et al. | |

FOREIGN PATENT DOCUMENTS

| | | | |
|---|---|---|---|
| KR | 1020160020811 | * | 2/2016 |
| KR | 1020160090562 | * | 8/2016 |
| KR | 20170068332 | | 6/2017 |

OTHER PUBLICATIONS

Pan, C., Kou, K., Jia, Q., Zhang, Y., Wang, Y, Wu, G., Feng, A.—Fabrication and characterization of micro-nano AIN co-filled PTFE composites with enhanced thermal conductivity: a morphology-promoted synergistic effect, J., Mater Sci: Mater Electron (2016), p. 11909-11916, published online on Jul. 18, 2016.*
Sigma-Aldrich Silicon Dioxide, 2019 (Year: 2019).*
Machine translation of KR 1020160020811, published on Feb. 24, 2016 (Year: 2016).*
Machine translation of KR 1020160090562, published on Aug. 1, 2016 (Year: 2016).*

* cited by examiner

*Primary Examiner* — Anca Eoff
(74) *Attorney, Agent, or Firm* — Robert C. Kowert; Kowert, Hood, Munyon, Rankin & Goetzel, P.C.

(57) ABSTRACT

An outer cover of a pouch-style battery includes a nanoceramic coating. Constructing an outer cover including a nanoceramic coating may include forming a malleable layer, applying a sealing layer to an inside surface of the malleable layer, and applying the nanoceramic layer to an outside surface of the malleable layer. Fabricating an outer cover including a nanoceramic coating may further include applying a protective film to an outside surface of the outer cover, which may be removed shortly before or after installation of a battery cell for which the outer cover is manufactured. Fabricating an outer cover including a nanoceramic coating may also include applying one or more adhesive layers, for example an adhesive layer between the malleable layer and the sealing layer. An outer cover including a nanoceramic coating may be sealed around a battery-active-material assembly to form a pouch-style battery cell.

21 Claims, 8 Drawing Sheets

BATTERY POUCH INCLUDING NANOCERAMIC COATING

This application claims benefit of priority to U.S. Provisional Patent Application Ser. No. 62/397,314, filed on Sep. 20, 2016, entitled "Battery Pouch Including Nanoceramic Coating", which is hereby incorporated by reference in its entirety.

BACKGROUND

Technical Field

The disclosed embodiments relate to battery cells suitable for battery packs configured to provide electrical power to a variety of devices, for example portable electronic devices. More specifically, the disclosed embodiments relate to battery pouches or covers including a nanoceramic coating and the construction thereof.

Description of the Related Art

Rechargeable batteries are presently used to provide power to a wide variety of portable devices, for example electronic devices including laptop computers, cell phones, PDAs, digital music players and cordless power tools. As these electronic devices become increasingly smaller and more powerful, the batteries that are used to power these devices need to store more energy in a smaller volume.

The most commonly used type of rechargeable battery is a lithium battery, which can include, for example, a lithium-ion or a lithium-polymer battery. Lithium-ion and lithium-polymer batteries typically contain a cathode current collector; a cathode comprised of an active material, a separator, an anode current collector, and an anode comprised of an active material. The cathode can comprise a cathode coating, and the anode can comprise an anode coating.

A battery can include a pouch-style battery including an outer cover (the "pouch") sealed around a battery-active-material assembly including electrodes and one or more layers of battery active material.

SUMMARY

An outer cover of a pouch-style battery includes a nanoceramic coating. Constructing an outer cover including a nanoceramic coating may include forming a malleable layer, applying a sealing layer to an inside surface of the malleable layer, and applying the nanoceramic layer to an outside surface of the malleable layer. Fabricating an outer cover including a nanoceramic coating may further include applying a protective film to an outside surface of the outer cover, which may be removed shortly before or after installation of a battery cell for which the outer cover is manufactured.

Fabricating an outer cover including a nanoceramic coating may also include applying one or more adhesive layers, for example an adhesive layer between the malleable layer and the sealing layer. An outer cover including a nanoceramic coating may be sealed around a battery-active-material assembly to form a pouch-style battery cell. In some embodiments, the malleable layer may comprise a metallic layer, for example an aluminum or stainless steel layer. Some embodiments may include a matte layer, for example to provide a desired coloring of the outer cover.

Figure 1:
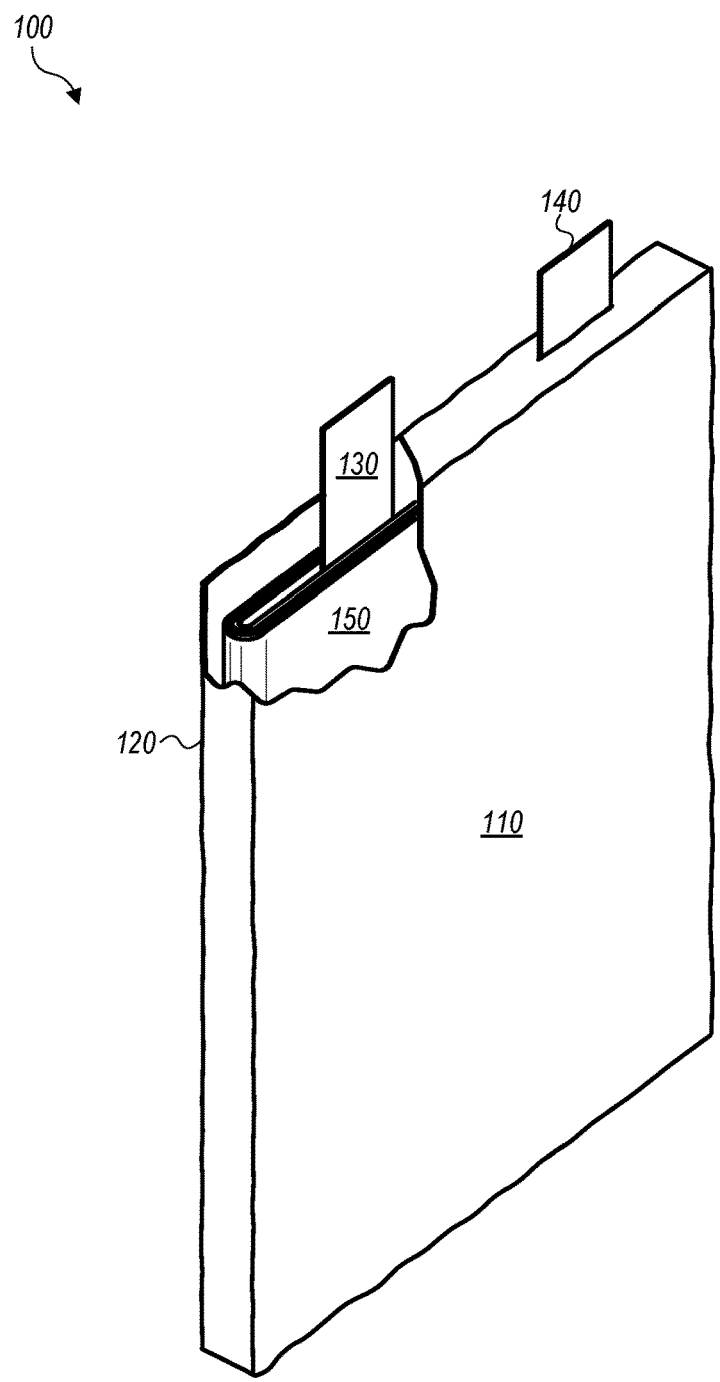
FIG. 1 is an isometric external view of an example pouch-style cell having an outer cover including a nanoceramic coating, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION OF EMBODIMENTS

Various embodiments of a battery cover including a nanoceramic layer are disclosed. Various embodiments of methods of constructing said battery cover are also disclosed.

FIG. 1 is an isometric external view of an example pouch-style battery 110 having an outer cover 120 including a nanoceramic coating, according to some embodiments. Battery 110 according to some embodiments may be a pouch-style battery cell having an outer cover 120 (also called a pouch). Battery 110 according to some embodiments may also include a battery-active-material assembly 150 and conducting tabs 130 and 140 extruding beyond the outer cover 120.

Outer cover 120 of battery 110 according to some embodiments may include one or more layers of materials, including a layer of a nanoceramic material. For example, in addition to the nanoceramic layer, cover 120 may include a malleable layer and various other layers as described in detail elsewhere herein.

Battery 110 according to some embodiments may include conducting tabs 130 and 140. Conducting tabs 130 and 140 according to some embodiments may be electrically coupled to electrodes of battery-active-material assembly 150. According to some embodiments, conducting tabs 130 and 140 may be physically attached to electrodes of assembly 150 by welding or another suitable attachment method that allows for electrical conduction between the electrodes and conducting tabs 130 and 140. Tabs 130 and 140 according to some embodiments may be constructed using a conductive foil, for example a copper foil or other suitable conducting material.

Assembly 150 according to some embodiments may include all of the components of a typical battery-active-material assembly suitable for a pouch-style battery or battery cell. For example, assembly 150 may include cathode and anode active materials, electrodes, and separators, among other components, arranged, for example, in a typical "jelly roll" or electrode stack configuration. Assembly 150 according to some embodiments may be sealed inside outer cover 120 in a pouch configuration, with tabs 130 and 140 protruding outside the pouch to allow for electrical conduction to assembly 150.

Figure 2A:
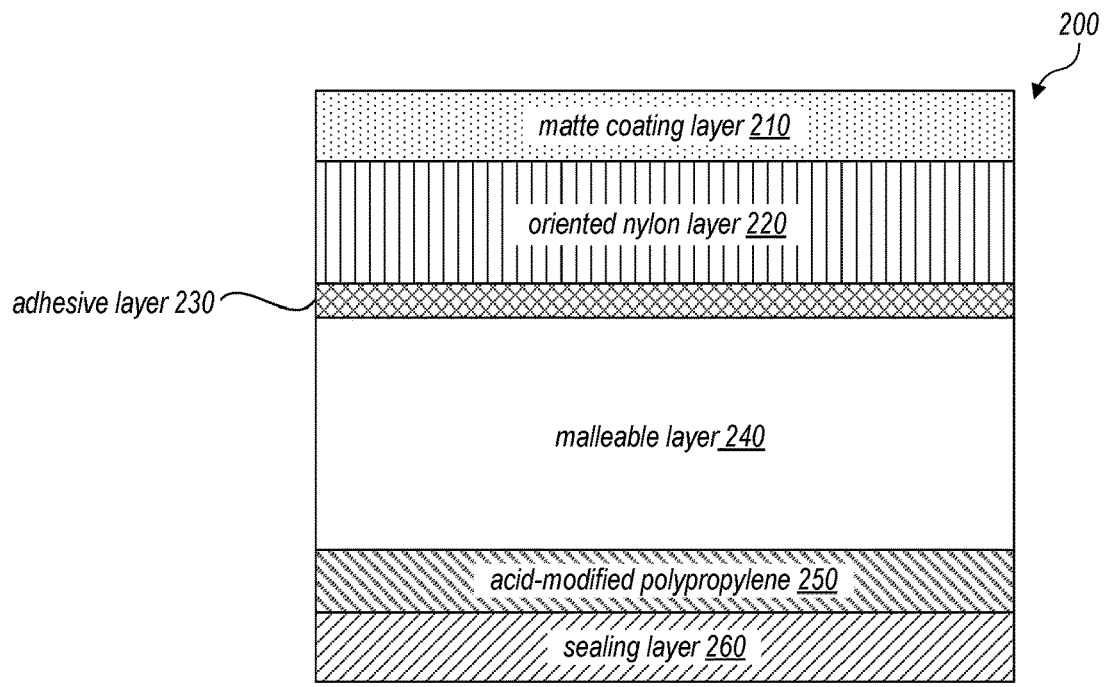
FIG. 2A is a prior art diagram showing several layers of materials of an outer cover of an example pouch-style battery cell.

FIG. 2A is a prior art diagram showing several layers of materials of an outer cover 200 of an example pouch-style battery cell. Some or all of the layers described with reference to FIG. 2A may be present in a typical outer cover for a pouch-style battery. In other examples, additional layers may be present or some layers may be positioned differently to the example outer cover of FIG. 2A. The total thickness of example cover 200 is approximately 60-120 μm, depending on the specific layer thicknesses, manufacturer, and manufacturing specifications.

Beginning with the inner-most layer—the layer closest to the active battery material in an assembled battery—layer 260 may comprise a sealing material. For example, layer 260 may comprise a polypropylene film for establishing a hermetic seal. Layer 260 may be applied using a heat lamination process, or another suitable application process. In some examples, a hermetic seal may be desirable to prevent leakage of an electrolyte or other substances, or permeation by substances inside the battery into materials of the outer cover, which may damage the outer cover. The thickness of layer 260 of example cover 200 is approximately 10-25 μm.

Layer 250 of FIG. 2A may comprise an acid-modified polypropylene material. A polypropylene layer modified by acid according to some examples may provide additional minimization of any potential penetration by electrolytes or other substances present in the battery. A layer 250 according to some examples may also provide an enhanced adhesion effect between a malleable layer 240 and polypropylene layer 260. An acid-modified polypropylene layer may be applied via heat extrusion or another suitable application method. The thickness of layer 250 of example cover 200 is approximately 10-25 μm.

A malleable layer 240 according to some examples may provide a primary structure for outer cover 200. Malleable layer 240, among other functions, may provide a two-way moisture barrier that may enhance the life span and reliability of a battery. Malleable layer 240 may be capable of being shaped, for example into a "cup" or pouch to receive a battery-active-material assembly.

Malleable layer 240 may include a rigid or semi-rigid yet malleable material. For example, a malleable layer 240 may be constructed substantially of aluminum or stainless steel. Example materials suitable for some examples include aluminum 8079 or 8021 (JIS H4160). The thickness of malleable layer 240 of example cover 200 is approximately 20-40 μm.

Adhesive layer 230 of example cover 200 may be applied to an outside surface of malleable layer 240, to provide adhesion between malleable layer 240 and an oriented nylon ("O-Nylon") layer 220. Adhesive layer 230 may be applied using a dry lamination process. For example, adhesive layer 230 may be applied using a Gravure roll-type coating process and a drying solvent. A measure of adhesion of layer 230 of example cover 200 is approximately 3.8 $g/m^2$, and the thickness is approximately 2-4 μm.

Adhesive layer 230 according to some examples may include ink or another coloring agent according to design and appearance specifications of a battery. In other examples, for example an aluminum-colored pouch-style battery, adhesive layer 230 may be transparent.

An oriented nylon layer 220 according to some examples may be applied to malleable layer 240 using adhesive layer 230. An oriented nylon layer 220 according to some examples may provide protection to malleable layer 240, for example by protecting malleable layer 240 from chemicals or mechanical stress. Oriented nylon layer 220 may additionally aid in providing an elongation effect during the process of forming cover 200 into a cup or pouch as described elsewhere herein. The thickness of layer 220 of the example cover 200 is approximately 10-25 μm.

A cover 200 according to some examples may also include a matte coating layer 210. Matte coating layer 210 may provide a cosmetic adjustment, for example an adjustment to a specular reflection gloss ("gloss unit") of a surface of cover 200. Matte coating layer 210 may include polyurethane polymers, and may be applied by a dry lamination process, for example a Gravure coating process. The thickness of layer 210 of example cover 200 is approximately 2-4 μm, with an adhesion of approximately 3.0 g/m².

Figure 2B:
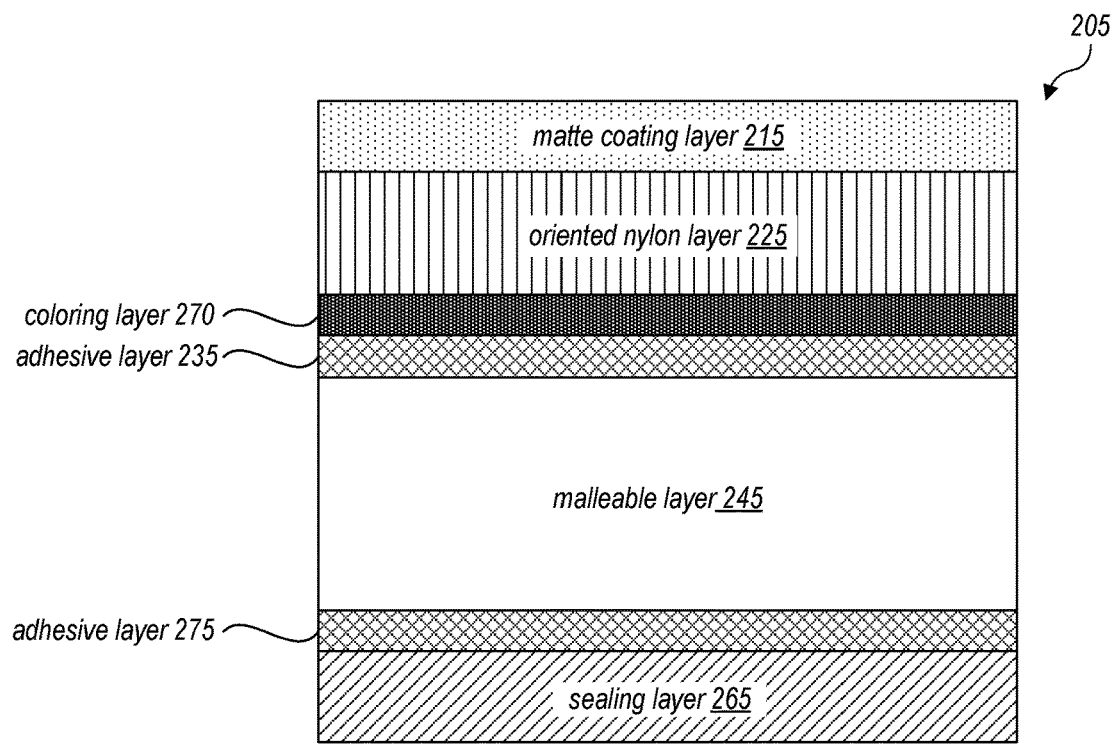
FIG. 2B is another prior art diagram showing several layers of materials of an outer cover of an example pouch-style battery cell.

FIG. 2B is another prior art diagram showing several layers of materials of an outer cover 205 of an example pouch-style battery cell. Some or all of the layers described with reference to FIG. 2B may be present in a typical outer cover for a pouch-style battery. In other examples, additional layers may be present or some layers may be positioned differently to the example outer cover of FIG. 2B. The total thickness of example cover 205 is approximately 60-120 μm, depending on the specific layer thicknesses, manufacturer, and manufacturing specifications.

Beginning with the inner-most layer—the layer closest to the active battery material in an assembled battery—layer 265 may comprise a sealing material. For example, layer 265 may comprise a casted polypropylene film for establishing a hermetic seal. In some examples, a hermetic seal may be desirable to prevent leakage of an electrolyte or other substances, or permeation by substances inside the battery into materials of the outer cover, which may damage the outer cover. The thickness of layer 265 of example cover 205 is approximately 20-40 μm.

Adhesive layer 275 of cover 205 may be applied to a surface of casted polypropylene layer 265, to provide adhesion between casted polypropylene layer 265 and malleable layer 245. Adhesive layer 275 may include a purpose-specific adhesive designed to inhibit electrolyte penetration into malleable layer 245. Adhesive layer 275 may be applied using a dry lamination process. For example, adhesive layer 275 may be applied using a Gravure roll-type coating process and a drying solvent. The thickness of layer 275 of example cover 205 is approximately 2-4 μm, and a measure of adhesion of layer 275 of example cover 205 is approximately 2-3 g/m².

A malleable layer 245 according to some examples may provide a primary structure for outer cover 205. Malleable layer 245, among other functions, may provide a two-way moisture barrier that may enhance the life span and reliability of a battery. Malleable layer 245 may be capable of being shaped, for example into a "cup" or pouch to receive a battery-active-material assembly.

Malleable layer 245, according to some examples, may include a rigid or semi-rigid yet malleable material. For example, a malleable layer 240 may be constructed substantially of aluminum or stainless steel. Example materials suitable for some examples include aluminum 8079 or 8021 (JIS H4160). The thickness of malleable layer 245 of example cover 205 is approximately 20-40 μm.

Adhesive layer 235 of example cover 205 may be applied to an outside surface of malleable layer 245, to provide adhesion between malleable layer 245 and an oriented nylon ("O-Nylon") layer 225. Adhesive layer 235 may be applied using a dry lamination process. For example, adhesive layer 235 may be applied using a Gravure roll-type coating process and a drying solvent. The thickness of layer 235 of example cover 205 is approximately 2-4 μm, and a measure of adhesion of layer 235 of example cover 205 is approximately 4-5 g/m².

Coloring layer 270 according to some examples may include ink or another coloring agent according to design and appearance specifications of a battery. The thickness of layer 270 of example cover 205 is approximately 2-4 μm, and a measure of adhesion of layer 270 of example cover 205 is approximately 2-3 g/m².

An oriented nylon layer 225 according to some examples may be applied to malleable layer 245 using adhesive layer 235. An oriented nylon layer 225 according to some examples may provide protection to malleable layer 245, for example by protecting malleable layer 245 from chemicals or mechanical stress. Oriented nylon layer 225 may additionally aid in providing an elongation effect during the process of forming cover 205 into a cup or pouch as described elsewhere herein. The thickness of layer 225 of the example cover 205 is approximately 10-25 μm.

A cover 205 according to some examples may also include a matte coating layer 215. Matte coating layer 215 may provide a cosmetic adjustment, for example an adjustment to a specular reflection gloss ("gloss unit") of a surface of cover 205. Matte coating layer 215 may include an f-based or urethane-based material, and may be applied by a dry lamination process, for example a Gravure coating process. The thickness of layer 215 of example cover 205 is approximately 2-4 μm, with an adhesion of approximately 2-3 g/m².

Figure 3:
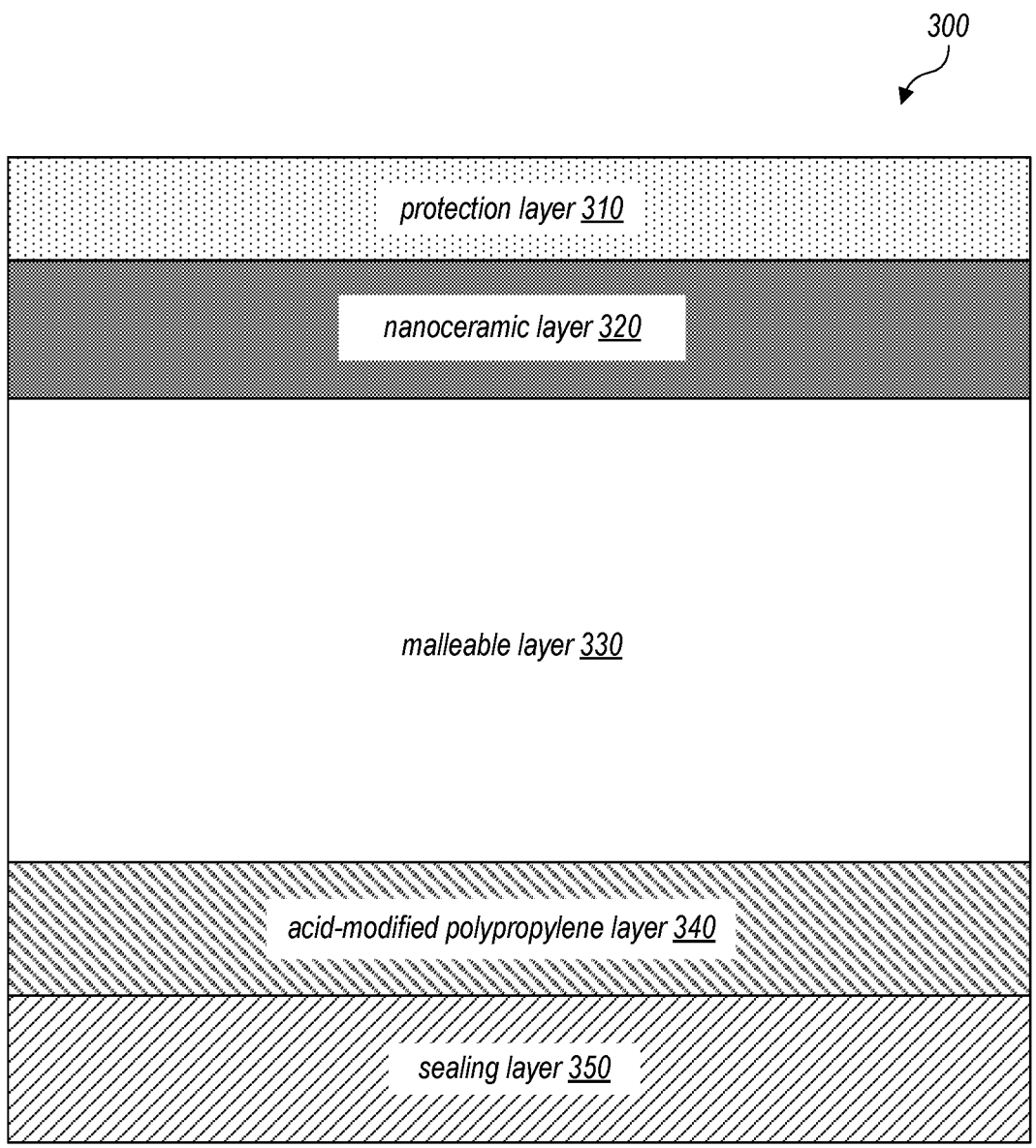
FIG. 3 is a diagram showing several layers of materials of an example battery outer cover including a nanoceramic layer, according to some embodiments.

FIG. 3 is a diagram showing several layers of materials of an example battery outer cover 300 including a nanoceramic layer, according to some embodiments. Additional layers not specifically shown in FIG. 3 may be present in some embodiments, and the order of some layers may be changed in some embodiments, according to the specific design of an embodiment, as one having ordinary skill in the art will appreciate. The total thickness of cover 300 according to some embodiments may be approximately 50-100 μm. In some examples designed for a thickness-sensitive application, the total thickness of cover 300 may be in the range of 56-58 μm. The 56-58 μm example represents approximately a 13-17% reduction in thickness versus the thinnest currently available examples of common outer cover constructions.

Beginning with the inner-most layer—the layer closest to the active battery material in an assembled battery—layer 350 according to some embodiments may comprise a sealing material. For example, layer 350 may comprise a polypropylene film for establishing a hermetic seal. Layer 350, according to some embodiments, may be applied using a heat lamination process, or another suitable application process as will be apparent to one having ordinary skill in the art. In some embodiments, a hermetic seal may be desirable to prevent leakage of an electrolyte or other substances, or permeation by substances inside the battery into materials of the outer cover 300, which may damage the outer cover 300. The thickness of layer 350 of example cover 300 may be in the range of 8-20 μm.

Layer 340 of FIG. 3 according to some embodiments may comprise an acid-modified polypropylene material. A polypropylene layer modified by acid according to some examples may provide additional minimization of any potential penetration by electrolytes or other substances present in a battery. A layer 340 according to some embodiments may also provide an enhanced adhesion effect between a malleable layer 330 and polypropylene layer 350. An acid-modified polypropylene layer may be applied in some embodiments via heat extrusion or another suitable application method as would be apparent to one having ordinary skill in the art. The thickness of layer 340 of example cover 300 is approximately 12-25 μm.

A malleable layer 330 according to some embodiments may provide a primary structure for outer cover 300. Malleable layer 330, among other functions, may provide a two-way moisture barrier that may enhance the life span and reliability of a battery. Malleable layer 330 may be a material suitable to being shaped, for example into a "cup" or pouch to receive a battery-active-material assembly in a typical pouch-style battery manufacturing process, according to some embodiments.

Malleable layer 330, according to some embodiments, may include a rigid or semi-rigid, yet malleable material. For example, a malleable layer 330 may be constructed substantially of aluminum or stainless steel. Example materials suitable for some examples include aluminum 8079 or 8021 (JIS H4160). The thickness of malleable layer 330 of example cover 300 may be approximately 20-40 µm.

A nanoceramic layer 320 of example cover 300 according to some embodiments may include a nanoceramic material to provide chemical and mechanical resistance. Use of a nanoceramic material in place of, or to enhance, one or more layers of known designs for a battery outer cover may reduce the overall thickness of the outer cover, saving valuable space and reducing cost of manufacturing. For example, according to some embodiments, a typical example cover 300 using a nanoceramic layer 320 may have a thickness approximately 12-18% less than that of the thinnest covers currently available that do not include a nanoceramic layer.

Additional advantages of a nanoceramic layer, such as nanoceramic layer 320 of example cover 300 include high dielectric strength and insulating properties of the nanoceramic material, coupled with high heat conduction rate, whereas some other materials, such as some materials typically used in known battery cover designs, tend to have a reduced heat conduction rate as insulating properties become stronger. Good heat-conduction properties may be desirable, for example, to increase the effectiveness of battery cooling schemes and techniques, which may enhance thermal stability of a battery.

A nanoceramic layer 320 of cover 300 according to some embodiments may be applied via spray coating, painting, brushing, a silk screening technique, or another suitable application method as would be apparent to one having ordinary skill in the art. Nanoceramic layer 320 may include any nanoceramic material having properties appropriate for the specific application. For example, nanoceramic layer 320 may include silicon dioxide, aluminum nitride, or another suitable nanoceramic material or combination of nanoceramic materials.

The overall thickness of nanoceramic layer 320 of example cover 300 may be approximately 3-20 µm. According to some embodiments, a dielectric thickness of an example nanoceramic layer 320 may be approximately: 500 volts at 5 µm, with pin holes observed; 800 volts at 7 µm, with pin holes observed; and 1,000 volts at 9 µm, with no observable pin holes.

Protection layer 310 of example cover 300 according to some embodiments may be applied to cover 300 at manufacturing, for example to protect cover 300 from mechanical stress and/or aid in elongation during a shaping process of cover 300. According to some embodiments, protection layer may be removed shortly before or after installation of a battery incorporating cover 300. Because protection layer 310 may be removed at installation, according to some embodiments the thickness of protection layer 310 may not be a critical concern with regard to the overall thickness of cover 300. The thickness according to some embodiments of protection layer 310 may be approximately 2-15 µm.

Protection layer 310 according to some embodiments may include a nylon or similar material. Protection layer 310 may replace or enhance current conventional processes, for example, those that include a sticky polymer protective film to prevent scratching during handling of a pouch-style battery.

Cover 300 according to some embodiments may include additional layers not shown at FIG. 3. For example, pouch 300 may include a matte coating layer similar to matte coating layer 210 as described with reference to FIG. 2A. In some embodiments, cover 300 may include ink or another coloring agent in one or more of its layers, according to design and appearance specifications of a battery.

Figure 4:
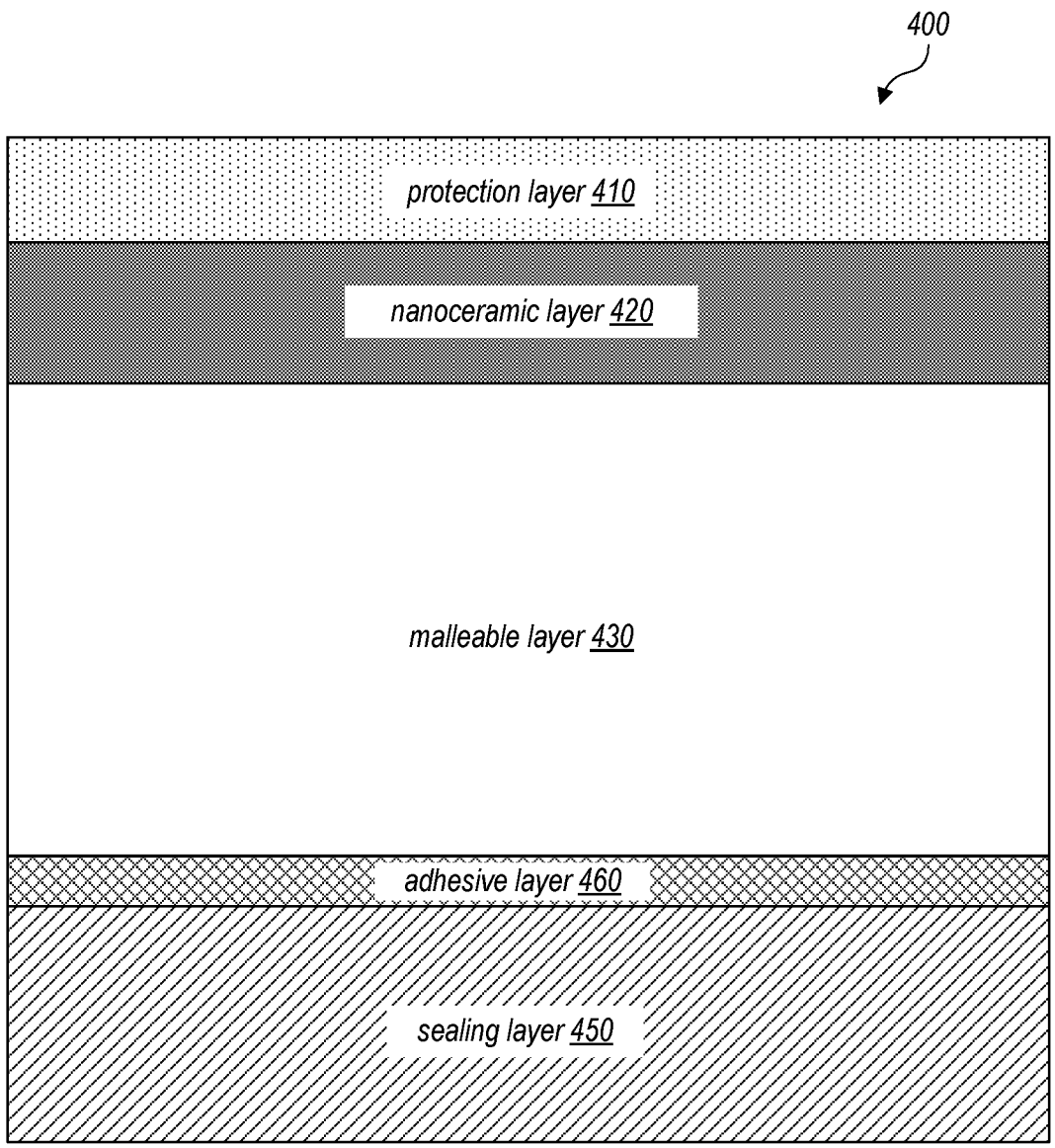
FIG. 4 is a diagram showing several layers of materials of another example battery outer cover including a nanoceramic layer, according to some embodiments.

FIG. 4 is a diagram showing several layers of materials of another example battery outer cover 400 including a nanoceramic layer, according to some embodiments. Additional layers not specifically shown in FIG. 4 may be present in some embodiments, and the order of some layers may be changed in some embodiments, according to the specific design of an embodiment, as one having ordinary skill in the art will appreciate. The total thickness of cover 400 according to some embodiments may be approximately 50-100 µm. In some examples designed for a thickness-sensitive application, the total thickness of cover 400 may be in the range of 56-58 µm. The 56-58 µm example represents approximately a 13-17% reduction in thickness versus the thinnest currently available examples of common outer cover constructions.

Beginning with the inner-most layer—the layer closest to the active battery material in an assembled battery—layer 450 according to some embodiments may comprise a sealing material. For example, layer 450 may comprise a casted polypropylene film for establishing a hermetic seal. Layer 450, according to some embodiments, may be applied using a heat lamination process, or another suitable application process as will be apparent to one having ordinary skill in the art. In some embodiments, a hermetic seal may be desirable to prevent leakage of an electrolyte or other substances, or permeation by substances inside the battery into materials of the outer cover 400, which may damage the outer cover 400. The thickness of layer 450 of example cover 400 may be in the range of 15-40 µm.

Adhesive layer 460 of cover 400 may be applied to a surface of casted polypropylene layer 450 to provide adhesion between casted polypropylene layer 450 and malleable layer 430. Adhesive layer 460 according to some embodiments may include a purpose-specific adhesive designed to inhibit electrolyte penetration into malleable layer 430. Adhesive layer 460 may be applied using a dry lamination process. For example, adhesive layer 460 may, according to some embodiments, be applied using a Gravure roll-type coating process and a drying solvent. The thickness of layer 460 of example cover 400 may be approximately 2-4 µm, and a measure of adhesion of layer 460 of example cover 400 may be approximately 2-3 g/m$^2$.

A malleable layer 430 according to some embodiments may provide a primary structure for outer cover 400. Malleable layer 430, among other functions, may provide a two-way moisture barrier that may enhance the life span and reliability of a battery. Malleable layer 430 may be a material suitable to being shaped, for example into a "cup" or pouch to receive a battery-active-material assembly in a typical pouch-style battery manufacturing process, according to some embodiments.

Malleable layer 430, according to some embodiments, may include a rigid or semi-rigid, yet malleable material. For example, a malleable layer 430 may be constructed substantially of aluminum or stainless steel. Example materials suitable for some examples include aluminum 8079 or 8021 (JIS H4160). The thickness of malleable layer 430 of example cover 400 may be approximately 20-40 µm.

A nanoceramic layer 420 of example cover 400 according to some embodiments may include a nanoceramic material to provide chemical and mechanical resistance. Use of a nanoceramic material in place of, or to enhance, one or more layers of known designs for a battery outer cover may reduce the overall thickness of the outer cover, saving valuable space and reducing cost of manufacturing. For example, according to some embodiments, a typical example cover 400 using a nanoceramic layer 320 may have a thickness approximately 12-18% less than that of the thinnest covers currently available that do not include a nanoceramic layer.

Additional advantages of a nanoceramic layer, such as nanoceramic layer 420 of example cover 400 include high dielectric strength and insulating properties of the nanoceramic material, coupled with high heat conduction rate, whereas some other materials, such as some materials typically used in known battery cover designs, tend to have a reduced heat conduction rate as insulating properties become stronger. Good heat-conduction properties may be desirable, for example, to increase the effectiveness of battery cooling schemes and techniques, which may enhance thermal stability of a battery.

A nanoceramic layer 420 of cover 400 according to some embodiments may be applied via spray coating, painting, brushing, a silk screening technique, or another suitable application method as would be apparent to one having ordinary skill in the art. Nanoceramic layer 420 may include any nanoceramic material having properties appropriate for the specific application. For example, nanoceramic layer 420 may include silicon dioxide, aluminum nitride, or another suitable nanoceramic material or combination of nanoceramic materials.

The overall thickness of nanoceramic layer 420 of example cover 300 may be approximately 3-20 µm. According to some embodiments, a dielectric thickness of an example nanoceramic layer may be approximately: 500 volts at 5 µm, with pin holes observed; 800 volts at 7 µm, with pin holes observed; and 1,000 volts at 9 µm, with no observable pin holes.

Protection layer 410 of example cover 400 according to some embodiments may be applied to cover 400 at manufacturing, for example to protect cover 400 from mechanical stress and/or aid in elongation during a shaping process of cover 400. According to some embodiments, protection layer 410 may be removed shortly before or after installation of a battery incorporating cover 400. Because protection layer 410 may be removed at installation, according to some embodiments the thickness of protection layer 410 may not be a critical concern with regard to the overall thickness of cover 400. The thickness according to some embodiments of protection layer 410 may be approximately 2-15 µm.

Protection layer 410 according to some embodiments may include a nylon or similar material. Protection layer 410 may replace or enhance current conventional processes, for example, those that include a sticky polymer protective film to prevent scratching during handling of a pouch-style battery.

Cover 400 according to some embodiments may include additional layers not shown at FIG. 4. For example, pouch 400 may include a matte coating layer similar to matte coating layer 210 as described with reference to FIG. 2A. In some embodiments, cover 400 may include ink or another coloring agent in one or more of its layers, according to design and appearance specifications of a battery.

Figure 5:
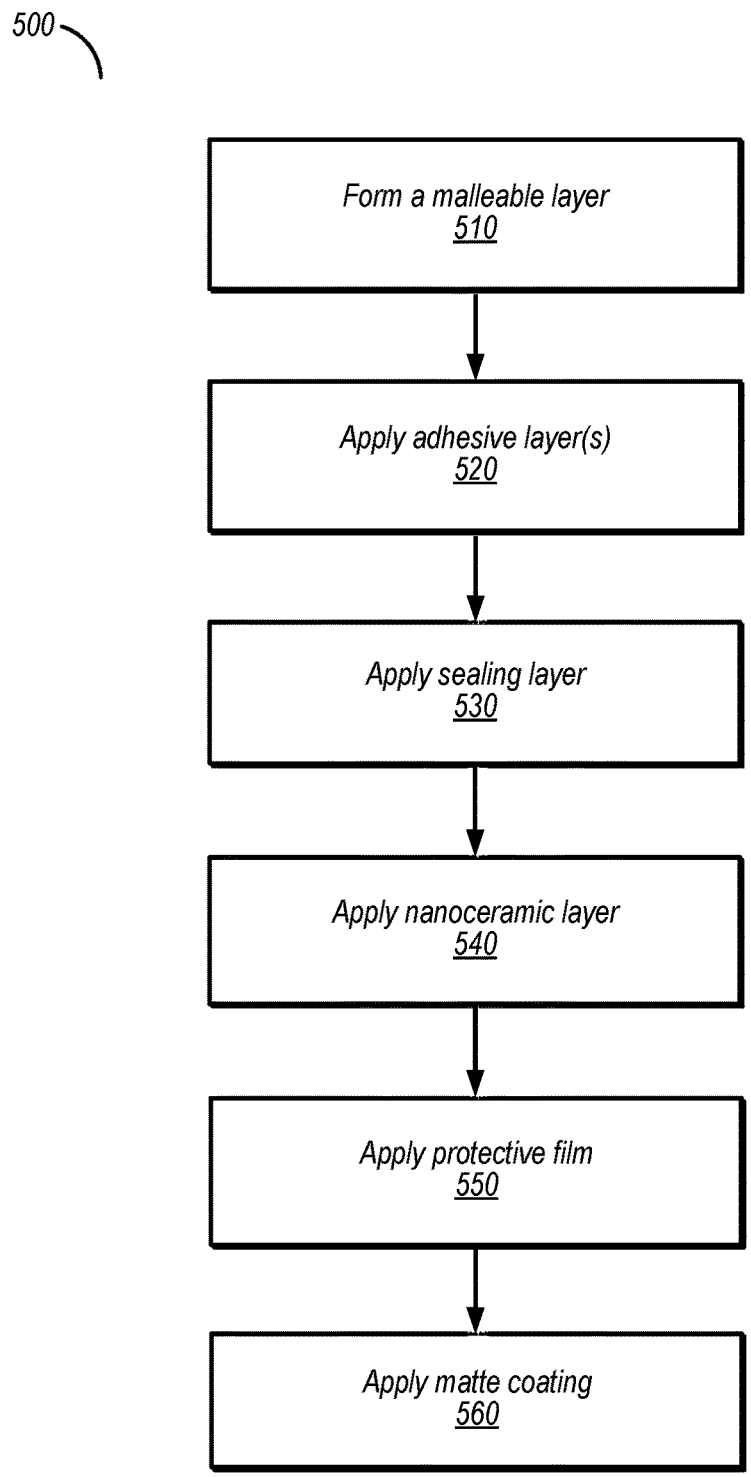
FIG. 5 is a flowchart of an example process for fabricating an example battery outer cover including a nanoceramic layer, according to some embodiments.

FIG. 5 is a flowchart of an example process 500 for fabricating an example battery outer cover including a nanoceramic layer, according to some embodiments. At step 510, a malleable layer is formed or obtained. For example, in example embodiments wherein the malleable layer is a foil, the malleable layer may be formed using any of the many known extruding processes as would be apparent to one having ordinary skill in the art. The malleable layer, according to some embodiments, may be similar to malleable layers 330 or 430 as described above with reference to FIG. 3 and FIG. 4, respectively.

At step 520 of process 500 according to some embodiments, an adhesive is applied to the malleable layer, for example an adhesive similar to adhesive layer 460 described above with respect to FIG. 4. The adhesive layer according to some embodiments may be applied using a dry lamination process. For example, the adhesive layer may be applied using a Gravure roll-type coating process and drying solvent. In some embodiments, for example in some embodiments including an acid-modified polypropylene layer, the adhesive layer of step 520 may be omitted.

At step 530 of process 500, a sealing layer is added to the cover. According to some embodiments, the sealing layer may be similar to the casted polypropylene layer 450 as described above with reference to FIG. 4. The sealing layer, according to some embodiments, may be applied using a heat lamination process or another suitable application process as will be apparent to one having ordinary skill in the art.

In some embodiments, the sealing layer applied at step 530 may include two or more distinct layers—for example, an acid-modified polypropylene layer similar to layer 340 and a polypropylene layer similar to layer 350, both as described above with reference to FIG. 3. According to some embodiments, a sealing layer may be applied, at least in part, via heat extrusion or another suitable application method as will be apparent to one having ordinary skill in the art.

At step 540 of process 500, a nanoceramic layer is applied. According to some embodiments, the nanoceramic layer may be applied to an outside surface of the malleable layer, for example on a surface opposite the surface on which the adhesive and/or sealing layers are applied to the malleable layer. The nanoceramic layer may be similar to layers 320 or 420 as described in detail above with reference to FIGS. 3 and 4, respectively.

According to some embodiments, a nanoceramic layer may be applied via spray coating, painting, brushing, a silk screening technique, or another suitable application method as would be apparent to one having ordinary skill in the art. The nanoceramic layer may include any nanoceramic material having properties appropriate for a specific application or design parameters. For example, the nanoceramic layer may include silicon dioxide, aluminum nitride, or another suitable nanoceramic material or combination of nanoceramic materials.

At step 550 of process 500, according to some embodiments, a protective film may be applied to an outside surface of the nanoceramic layer. This protective film according to some embodiments may be similar to protection layers 310 or 410 as described in detail above with respect to FIGS. 3 and 4, respectively.

At step 560 of process 500, according to some embodiments, a matte coating layer may be applied. The matte coating may be similar, for example, to layer 210 as described above with respect to FIG. 2. In other embodiments, the cover of process 500 may include ink or another coloring agent applied to one or more of its layers, according to design and appearance specifications of a battery.

Figure 6:
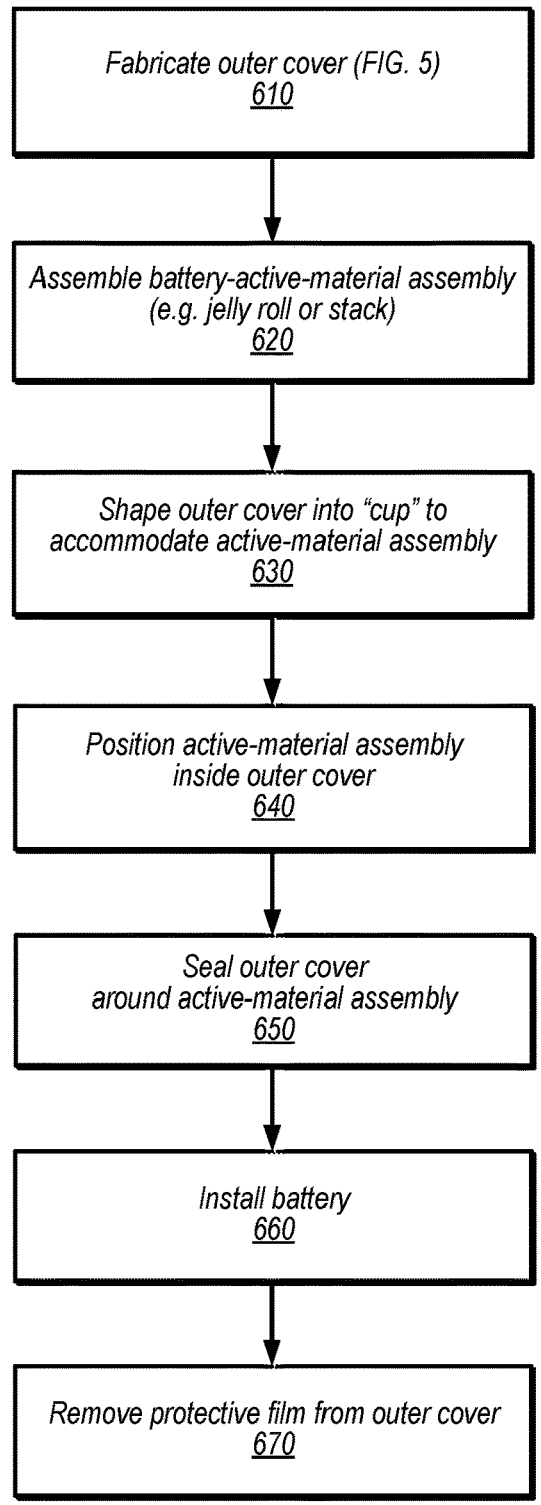
FIG. 6 is a flowchart of an example process for fabricating a pouch-style battery having an outer cover including a nanoceramic layer, according to some embodiments.

FIG. 6 is a flowchart of an example process 600 for fabricating a pouch-style battery having an outer cover including a nanoceramic layer, according to some embodiments. At step 610 of process 600, an outer cover or "pouch" is fabricated, for example according to process 500 of FIG. 5 as discussed in detail above.

At step 620 of process 600, a battery-active-material assembly is assembled. For example, a typical "jelly roll" or electrode stack configuration of cathode and anode active materials, electrodes, and separating materials may be assembled, shaped, and sized according to capacity and form-factor requirements of a battery.

At step 630 of process 600, according to some embodiments, the outer cover is shaped into a cup or pouch of a size and shape suitable to hold the battery-active-material assembly. For example, the outer cover may be machine-pressed or otherwise physically manipulated to form the cup.

At step 640 of process 600, the battery-active material assembly may be positioned within the cup or pouch of the outer cover. At step 650 of process 600, according to some embodiments, the outer cover is sealed around the battery-active-material assembly. According to some embodiments, one or more conducting tabs may protrude from an interior of the battery pouch, beyond the sealed barrier, to outside the battery pouch, in order to allow for electrical conductivity to and from the battery-active-material assembly.

At step 660 of process 600, the assembled battery may be installed. For example, the battery may be placed within a battery chamber or battery pack of a product. In some embodiments, the battery may be electrically coupled to other similar batteries to form a battery pack.

At step 670 of example process 600, a protective film may be removed from the outer cover. For example a protective film applied at step 550 of example process 500 may be removed after or just before step 660 of process 600.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops, cameras, cell phones, or tablet computers, may also be used. It should also be understood that, in some embodiments, the device is not a portable communications device, but is a desktop computer with a camera. In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 7:
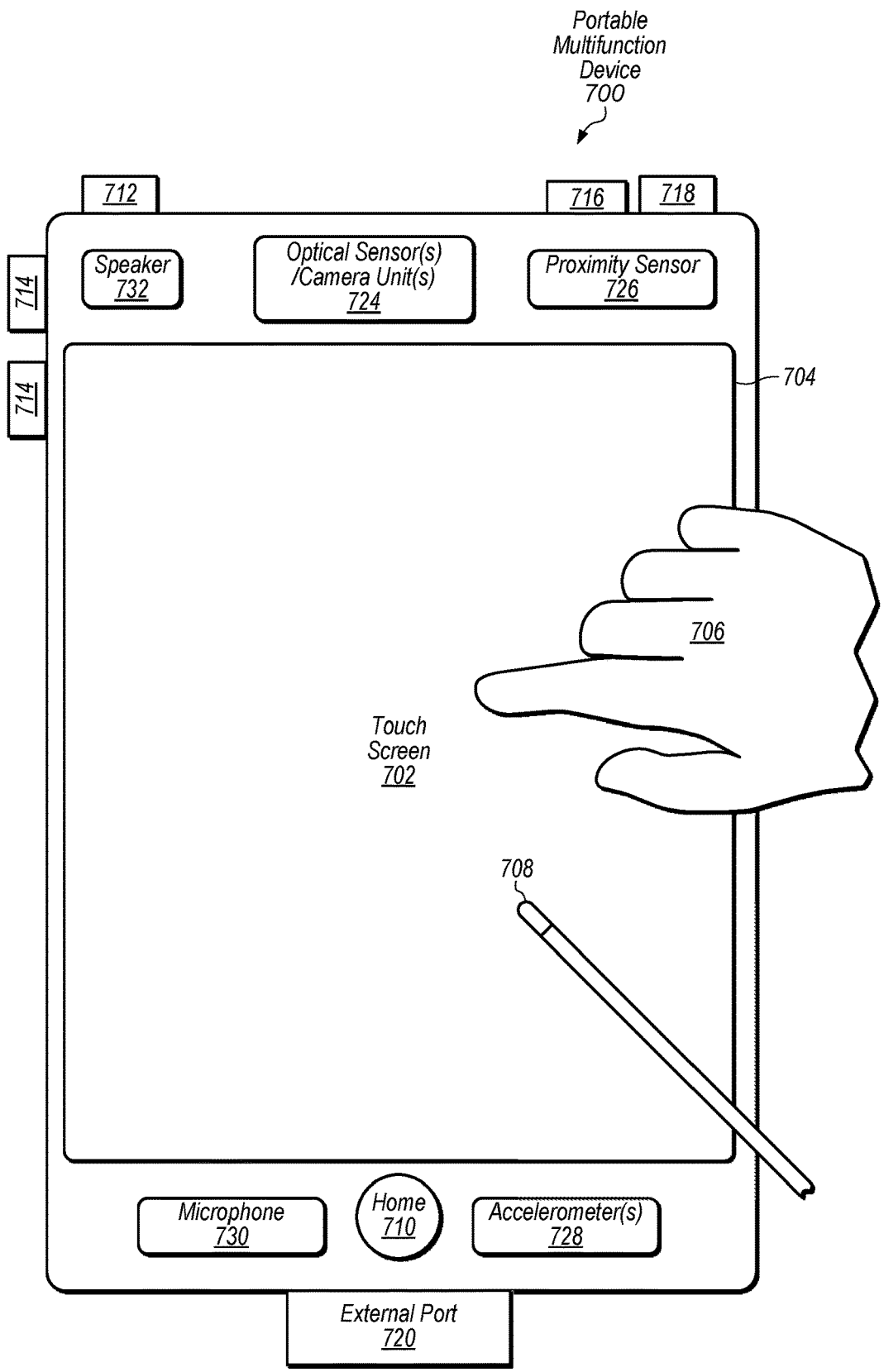
FIG. 7 depicts an example portable multifunction device with which a battery having an outer cover may be used, in accordance with some embodiments.

FIG. 7 illustrates a portable multifunction device 700 that may include embodiments of the batteries disclosed herein, e.g., in the discussion above with reference to FIGS. 1-6. Device 700 may include a display, e.g., a touch screen 702. The touch screen 702 may display one or more graphics within user interface (UI) 704. In this embodiment, as well as others described below, a user may select one or more of the graphics by making a gesture on the graphics, for example, with one or more fingers 706 (not drawn to scale in the figure) or one or more styluses 708 (not drawn to scale in the figure).

Device 700 may also include one or more physical buttons, such as "home" or menu button 710. The menu button 710 may be used to navigate to any application in a set of applications that may be executed on device 700. Alternatively, in some embodiments, the menu button 710 is implemented as a soft key in a GUI displayed on touch screen 702.

In one embodiment, device 700 includes touch screen 702, menu button 710, push button 712 for powering the device on/off and locking the device, volume adjustment button(s) 714, Subscriber Identity Module (SIM) card slot 716, head set jack 718, and docking/charging external port 720. Push button 712 may be used to turn the power on/off on the device 700 by depressing the button and holding the button in the depressed state for a predefined time interval; to lock the device 700 by depressing the button and releasing the button before the predefined time interval has elapsed; and/or to unlock the device 700 or initiate an unlock process. In an alternative embodiment, device 700 also may accept verbal input for activation or deactivation of some functions through microphone 722.

Device 700 may also include optical sensors or cameras 724. Optical sensors 724 may include charge-coupled device (CCD) or complementary metal-oxide semiconductor (CMOS) phototransistors. Optical sensors 724 receive light from the environment, projected through one or more lens, and converts the light to data representing an image. Optical sensors 724 may be used to capture still images or video. In some embodiments, an optical sensor 724 is located on the back of device 700, opposite touch screen display 702 on the front of the device 700, so that the touch screen display 702 may be used as a viewfinder for still and/or video image acquisition. In some embodiments, another optical sensor 724 is located on the front of the device 700 so that the user's image may be obtained for videoconferencing while the user views the other video conference participants on the touch screen display. In embodiments in which multiple cameras or optical sensors 724 are supported, each of the multiple cameras or optical sensors 724 may include its own photosensor(s), or the multiple cameras or optical sensors 724 may be supported by a shared photosensor. Likewise, in embodiments in which multiple cameras or optical sensors 724 are supported, each of the multiple cameras or optical sensors 724 may include its own image processing pipeline of processors and storage units, or the multiple cameras or optical sensors 724 may be supported by an image processing pipeline of processors and storage units.

Device 700 may include one or more proximity sensors 726. In some embodiments, the proximity sensor 726 turns off and disables touch screen 702 when the multifunction device 700 is placed near the user's ear (e.g., when the user is making a phone call).

Device 700 may include one or more orientation sensors 728. In some embodiments, the one or more orientation sensors include one or more accelerometers 728 (e.g., one or more linear accelerometers and/or one or more rotational accelerometers). In some embodiments, the one or more orientation sensors 728 include one or more gyroscopes. In some embodiments, the one or more orientation sensors 728 include one or more magnetometers. In some embodiments, the one or more orientation sensors 728 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 700. In some embodiments, the one or more orientation sensors 728 include any combination of orientation/rotation sensors. In some embodiments, information is displayed on the touch screen display 702 in a portrait view or a landscape view based on an analysis of data received from the one or more orientation sensors 728.

Device 700 may include one or more microphones 730 and/or one or more speakers 732, which, along with audio circuitry, provide an audio interface between a user and device 700. The audio circuitry receives audio data from a peripherals interface, converts the audio data to an electrical signal, and transmits the electrical signal to the speaker 732. Speaker 32 converts the electrical signal to human-audible sound waves. Audio circuitry also receives electrical signals converted by microphone 730 from sound waves. Audio circuitry converts the electrical signal to audio data and transmits the audio data to the peripherals interface for processing. Audio data may be retrieved from and/or transmitted to memory and/or RF circuitry by the peripherals interface. In some embodiments, the audio circuitry also includes the headset jack 718. The headset jack 718 provides an interface between the audio circuitry and removable audio input/output peripherals, such as output-only headphones or a headset with both output (e.g., a headphone for one or both ears) and input (e.g., a microphone).

Example Computer System

Figure 8:
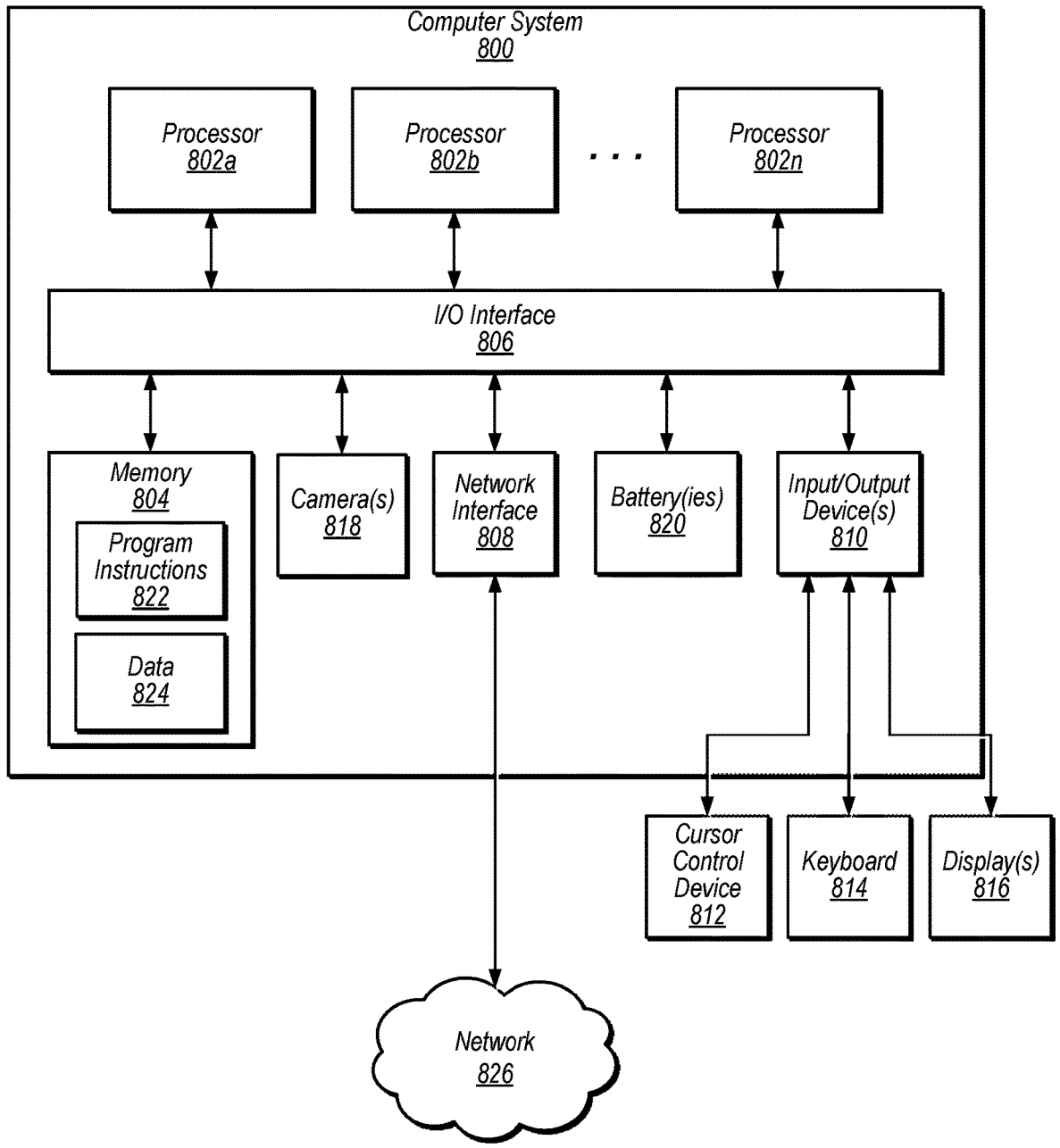
FIG. 8 illustrates an example computer system with which a battery having an outer cover may be used, in accordance with some embodiments.

FIG. 8 illustrates an example computing device, referred to as computer system 800, that may include embodiments of the batteries disclosed herein, e.g., in the discussion above with reference to FIGS. 1-7. In different embodiments, computer system 800 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes a network interface 808 coupled to I/O interface 806, and one or more input/output devices 810, such as cursor control device 812, keyboard 814, and display(s) 816. Computer system 800 may also include one or more cameras 818 and/or one or more batteries 820, which may also be coupled to I/O interface 806.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA.

System memory 804 may be configured to store program instructions 822 and/or data 824 accessible by processor 802. In various embodiments, system memory 804 may be implemented using any suitable memory technology, such as static random access memory (SRAM), synchronous dynamic RAM (SDRAM), nonvolatile/Flash-type memory, or any other type of memory. In the illustrated embodiment, program instructions 822 may be configured to implement various interfaces, methods and/or data for controlling operations of the battery(ies) 820. Furthermore, program instructions 822 may be configured to implement various interfaces, methods and/or data for controlling operations of the camera 818 and for capturing and processing images with integrated camera 818 or other methods or data, for example interfaces and methods for capturing, displaying, processing, and storing images captured with camera 818. In some embodiments, program instructions 822 and/or data 824 may be received, sent or stored upon different types of computer-accessible media or on similar media separate from system memory 804 or computer system 800.

In one embodiment, I/O interface 806 may be configured to coordinate I/O traffic between processor 802, system memory 804, and any peripheral devices in the device, including network interface 808 or other peripheral interfaces, such as input/output devices 810. In some embodiments, I/O interface 806 may perform any necessary protocol, timing or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processor 802.

Network interface 808 may be configured to allow data to be exchanged between computer system 800 and other devices attached to a network 826 (e.g., carrier or agent devices) or between nodes of computer system 800. Network 826 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 808 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 810 may, in some embodiments, include one or more display terminals, keyboards, keypads, touchpads, scanning devices, voice or optical recognition devices, or any other devices suitable for entering or accessing data by computer system 800. Multiple input/output devices 810 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 808.

As shown in FIG. 8, memory 804 may include program instructions 822, which may be processor-executable to implement any element or action to support the battery(ies) 820. For instance, data from signals produced by the battery(ies) 820 may be stored to memory 804 in some cases. Furthermore, the program instructions 822 may be processor-executable to implement any element or action to support the integrated camera 818, including but not limited to image processing software and interface software for controlling camera 818. In some embodiments, images captured by camera 818 may be stored to memory 804. In addition, metadata for images captured by camera 818 may be stored to memory 804.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 800 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A battery, comprising:
    one or more pouch cells, at least one of the one or more pouch cells comprising an outer cover, the outer cover comprising:
        a nanoceramic layer of nanoceramic material, the nanoceramic layer having a thickness ranging from 3 microns to 20 microns;
        a sealing layer positioned adjacent an active material of the at least one of the one or more pouch cells;
        a malleable layer positioned between the nanoceramic layer and the sealing layer, wherein the malleable layer is a metallic layer adjacent the nanoceramic layer; and
        an adhesion-providing layer that provides adhesion between the sealing layer and the malleable layer, wherein the adhesion-providing layer comprises:
            a first surface adjacent the sealing layer; and
            a second surface adjacent the malleable layer;
        wherein the outer cover has a total thickness ranging from 50 microns to 100 microns.

2. The battery of claim 1, wherein the outer cover further comprises a protective film.

3. The battery of claim 1, wherein the outer cover further comprises a matte coating layer.

4. The battery of claim 1, further comprising a battery-active-material assembly, the battery-active-material assembly sealed within the outer cover.

5. The battery of claim 4, further comprising one or more conducting tabs, the one or more conducting tabs protruding from an interior of the outer cover beyond an exterior boundary of the outer cover.

6. The battery of claim 1, wherein the adhesion-providing layer comprises:
an acid-modified polypropylene material, wherein the adhesion-providing layer comprising the acid-modified polypropylene material has a thickness ranging from 12 to 25 microns, or
an adhesive material, wherein the adhesion-providing layer comprising the adhesive material has a thickness ranging from 2 to 4 microns;
wherein the adhesion-providing layer is configured to inhibit electrolyte penetration into the malleable layer.

7. The battery of claim 1, wherein the nanoceramic layer comprises one or more of:
a silicon dioxide layer; or
an aluminum nitride layer.

8. The battery of claim 1, wherein the malleable layer comprises one or more of:
an aluminum layer; or
a stainless steel layer.

9. The battery of claim 1, wherein the sealing layer comprises a polypropylene layer.

10. The battery of claim 9, wherein the polypropylene layer comprises one or more of:
a polypropylene film;
a casted polypropylene film; or
an acid-treated polypropylene layer.

11. A method, comprising:
at least partially fabricating a battery, the at least partially fabricating the battery comprising fabricating one or more pouch cells, the fabricating one or more pouch cells comprising:
fabricating an outer cover of at least one of the one or more pouch cells, the fabricating the outer cover comprising:
applying an adhesion-providing layer between a sealing layer and a malleable layer, such that:
a first surface of the adhesion-providing layer is adjacent the sealing layer; and
a second surface of the adhesion-providing layer is adjacent the malleable layer;
wherein the adhesion-providing layer provides adhesion between the sealing layer and the malleable layer, and wherein the malleable layer is a metallic layer; and
applying a nanoceramic layer of nanoceramic material to an outside surface of the malleable layer, the outside surface at least partially opposite the adhesion-providing layer such that the malleable layer is positioned between the sealing layer and the nanoceramic layer, the nanoceramic layer having a thickness ranging from 3 microns to 20 microns;
positioning a battery-active-material assembly within the outer cover; and
sealing the outer cover around the battery-active-material assembly;
wherein the outer cover has a total thickness ranging from 50 microns to 100 microns.

12. The method of claim 11, wherein fabricating the outer cover further comprises applying a protective film to the outer cover.

13. The method of claim 12, wherein at least partially fabricating the battery further comprises:
installing the battery; and
removing the protective film.

14. The method of claim 11, wherein fabricating the outer cover further comprises shaping the outer cover to accommodate the battery-active-material assembly.

15. The method of claim 11, wherein fabricating the outer cover further comprises applying a matte coating layer.

16. The method of claim 11, wherein the adhesion-providing layer comprises:
an acid-modified polypropylene material, wherein the adhesion-providing layer comprising the acid-modified polypropylene material has a thickness ranging from 12 to 25 microns, or
an adhesive material, wherein the adhesion-providing layer comprising the adhesive material has a thickness ranging from 2 to 4 microns;
wherein the adhesion-providing layer is configured to inhibit electrolyte penetration into the malleable layer.

17. The method of claim 11, wherein applying the nanoceramic layer comprises one or more of:
spray coating the nanoceramic material;
painting the nanoceramic material;
silk screening the nanoceramic material; or
brushing the nanoceramic material onto the malleable layer.

18. The method of claim 11, wherein the sealing layer comprises one or more of:
a polypropylene film;
a casted polypropylene film; or
an acid-treated polypropylene layer.

19. The method of claim 11, wherein the battery-active-material assembly comprises a lithium-ion cathode material.

20. A portable electronic device, comprising:
at least one functional component configured to consume electrical power; and
a battery configured to provide electrical power support to the at least one functional component, the battery comprising an outer cover, the outer cover comprising:
a nanoceramic layer of nanoceramic material, the nanoceramic layer having a thickness ranging from 3 microns to 20 microns;
a sealing layer positioned adjacent an active material of the at least one of the one or more pouch cells;
a malleable layer positioned between the nanoceramic layer and the sealing layer, wherein the malleable layer is a metallic layer adjacent the nanoceramic layer; and
an adhesion-providing layer that provides adhesion between the sealing layer and the malleable layer, wherein the adhesion-providing layer comprises:
a first surface adjacent the sealing layer; and
a second surface adjacent the malleable layer;
wherein the outer cover has a total thickness ranging from 50 microns to 100 microns.

21. The portable electronic device of claim 20, wherein the battery further comprises a battery-active-material assembly, the battery-active-material assembly sealed within the outer covering.

* * * * *